US008875862B2

(12) United States Patent
Lin

(10) Patent No.: US 8,875,862 B2
(45) Date of Patent: Nov. 4, 2014

(54) RATCHET HUB

(75) Inventor: Wen-Hwa Lin, Taichung (TW)

(73) Assignee: VP Components Co., Ltd., Taichung (TW)

( * ) Notice: Subject to any disclaimer, the term of this patent is extended or adjusted under 35 U.S.C. 154(b) by 473 days.

(21) Appl. No.: 13/298,689

(22) Filed: Nov. 17, 2011

(65) Prior Publication Data

US 2013/0126292 A1 May 23, 2013

(51) Int. Cl.
*F16D 41/24* (2006.01)
*F16D 27/01* (2006.01)
*F16D 41/32* (2006.01)
*F16D 7/04* (2006.01)

(52) U.S. Cl.
CPC ............... *F16D 7/044* (2013.01); *F16D 41/32* (2013.01)
USPC ............................................. 192/64; 192/46

(58) Field of Classification Search
USPC ........................................................ 192/84.93
See application file for complete search history.

(56) References Cited

U.S. PATENT DOCUMENTS

| 3,240,304 | A  | * | 3/1966  | Wickersham ............... 192/56.42 |
|-----------|----|---|---------|-------------------------------------|
| 2009/0255774 | A1 | * | 10/2009 | Hsu ................................... 192/64 |
| 2012/0048671 | A1 | * | 3/2012  | Kozak et al. ...................... 192/64 |
| 2012/0285785 | A1 | * | 11/2012 | Tho ................................... 192/64 |

* cited by examiner

*Primary Examiner* — Gene Crawford
*Assistant Examiner* — Mark Manley
(74) *Attorney, Agent, or Firm* — WPAT, P.C.; Anthony King

(57) ABSTRACT

A ratchet hub using a magnetic force for restoration as disclosed has a freewheel unit and a ratchet ring thereof forming a unidirectional ratchet mechanism and a magnetic assembly using a magnetically repulsive force to normally make the freewheel unit and ratchet ring engage mutually and allow force transmission therebetween. Once a force disengaging the freewheel unit from the ratchet ring surpasses the magnetically repulsive force, the ratchet ring is pushed away from the freewheel unit. When the force disengaging the freewheel unit from the ratchet ring disappears, the magnetically repulsive force automatically and promptly returns the ratchet ring to engage with the freewheel unit again.

7 Claims, 5 Drawing Sheets

RATCHET HUB

BACKGROUND OF THE INVENTION

1. Technical Field

The present invention relates to bicycle parts, and more particularly, to a ratchet hub using a magnetic force to restore its unidirectional ratchet mechanism. The ratchet hub is advantageous for having less resistance and being free from problems related to elastic fatigue. Furthermore, the disclosed ratchet hub can be promptly switched between forward rotation for transmission and reverse rotation for restoration, without the risk of being jammed.

2. Description of Related Art

Conventionally, a rear hub of a bicycle implements a spring as a power source for restoring its unidirectional ratchet device. While the prior art uses a return spring that provides resilience large enough to restore the ratchet block, it suffers relatively large operational resistance. In addition, after long-term use, the spring tends to exhibit elastic fatigue that retards the unidirectional ratchet device from rapidly resorting to drive the hub.

On the other hand, Taiwan Patent No. M330208 has disclosed a hub ratchet device that includes a sleeve, a ratchet block, a ratchet ring being next to a freewheel device and more than one permanent magnets deposited on the ratchet block at an end distant from the freewheel device. The prior-art device employs the magnetic attraction generated among the permanent magnet, the ratchet block and the sleeve to restore the ratchet block, so that the ratchet ring and the freewheel device provide unidirectional transmission with reduced resistance and without the problem of elastic fatigue.

The prior-art device thus must have its ratchet block and sleeve made of magnetically permeable metal. Moreover, the ratchet block has to be such processed that one end thereof is formed with annularly arranged teeth for engaging the sleeve and that its surface interfacing sleeve limits rotation of the sleeve. In the event that the ratchet block and the sleeve are directly made by processing magnetically permeable metal, their magnetism is likely to reduce or lose due to cutting, high heat and/or impact during their processing. In the event that the ratchet block and the sleeve are first shaped and then magnetized, additional processing procedures are required and therefore the manufacturing cost is increased. Besides, since the shaped ratchet block and the sleeve are uneven in surface, the magnetization may be ineffective.

Moreover, because most components of the prior-art device, particularly the freewheel device, are made of magnetically permeable metal, when the ratchet block has its annularly arranged teeth engaging with the freewheel device, the magnetism of the ratchet block further strengthen the combination, and causes the ratchet block to be inseparable from the freewheel device, thereby hindering the reverse rotation of the ratchet device. The magnetism of the ratchet block also tends to attract foreign iron dust that causes addition wear to the components of the device.

SUMMARY OF THE INVENTION

In view of the shortcomings of the prior art, the present invention provides a ratchet hub using a magnetically repulsive force for restoration. The advantages of the present invention includes reducing operational resistance, eliminating the problem of elastic fatigue, simplifying the structure and assembling process, and ensuring smooth engagement and disengagement between the components of the ratchet hub.

According to the present invention, a ratchet hub comprises:

a hub body having one end formed with an open-end ratchet shell;

a ratchet assembly coaxially received in the ratchet shell of the hub body, wherein the ratchet assembly comprises:

a freewheel unit being configured to rotate along a first rotational direction or a second rotational direction when receiving a driving power, and having a first circular toothed surface;

a ratchet ring having a second circular toothed surface configured to engage with the first circular toothed surface of the freewheel unit, wherein the first circular toothed surface and the second circular toothed surface form a unidirectional ratchet mechanism, such that when the freewheel unit rotate along the first rotational direction, the first circular toothed surface and the second circular toothed surface engage with each other and allow force transmission therebetween, and when the freewheel unit rotates along the second rotational direction, the first circular toothed surface and the second circular toothed surface disengage from each other and disallow force transmission therebetween;

a sliding sleeve being telescoped with the ratchet ring in a manner that the sliding sleeve and the ratchet ring are axially slidable yet non-rotatable with respect to each other, such that the ratchet ring is allowed to slide axially against the sliding sleeve between an engaged position and a disengaged position, wherein when the ratchet ring is at the engaged position, the first circular toothed surface and the second circular toothed surface engage with each other, and when the ratchet ring is at the disengaged position, the first circular toothed surface and the second circular toothed surface disengage from each other;

a magnetic assembly including a first magnetic part fixed to the ratchet ring and a second magnetic part fixed to the hub body, wherein the first and second magnetic parts face each other with the same magnetic pole, such that a repulsive force normally exists therebetween, in which the repulsive force makes the ratchet ring normally stay at the engaged position, and when the freewheel unit rotates along the second rotational direction, a force disengaging the first circular toothed surface from the second circular toothed surface surpasses the repulsive force and pushes the ratchet ring toward the disengaged position.

One objective of the present invention is to reduce operational resistance and eliminate the problem elastic fatigue as that happens in the prior art, and the scheme implemented by the present invention is arranging the first magnetic part and the second magnetic part to face each other with the same magnetic pole. Thereby, the magnetically repulsive force normally existing between the two magnetic parts can reliably make the second circular toothed surface restore to engage the first circular toothed surface with reduced operational resistance and without the problem of elastic fatigue.

Another objective of the present invention is to simplify the structure and assembling process of the disclosed hub, and the scheme implemented by the present invention is using a plurality of magnetic members to provide magnetism to the first magnetic part, and using the connecting portion of the ratchet ring to engage the first magnetic part so that the second magnetic part and the ratchet ring move dependently. In addition, the ratchet ring may be designed and made with any shape as needed without affecting the magnetism independently provided by the magnetic members that are made separately.

Still another objective of the present invention is to ensure smooth engagement and disengagement between the components of the ratchet hub, and the scheme implemented by the present invention is making one or both of the ratchet ring and the freewheel unit from a non-magnetically permeable material so that when approached by the magnetic members, they will not cause the second circular toothed surface and the first circular toothed surface to be inseparable from each other due to magnetic attraction. This design not only ensures the normal operation of the ratchet hub, but also prevents foreign matters such as iron dust from being attracted into the interior of the hub and wearing the components of the hub.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
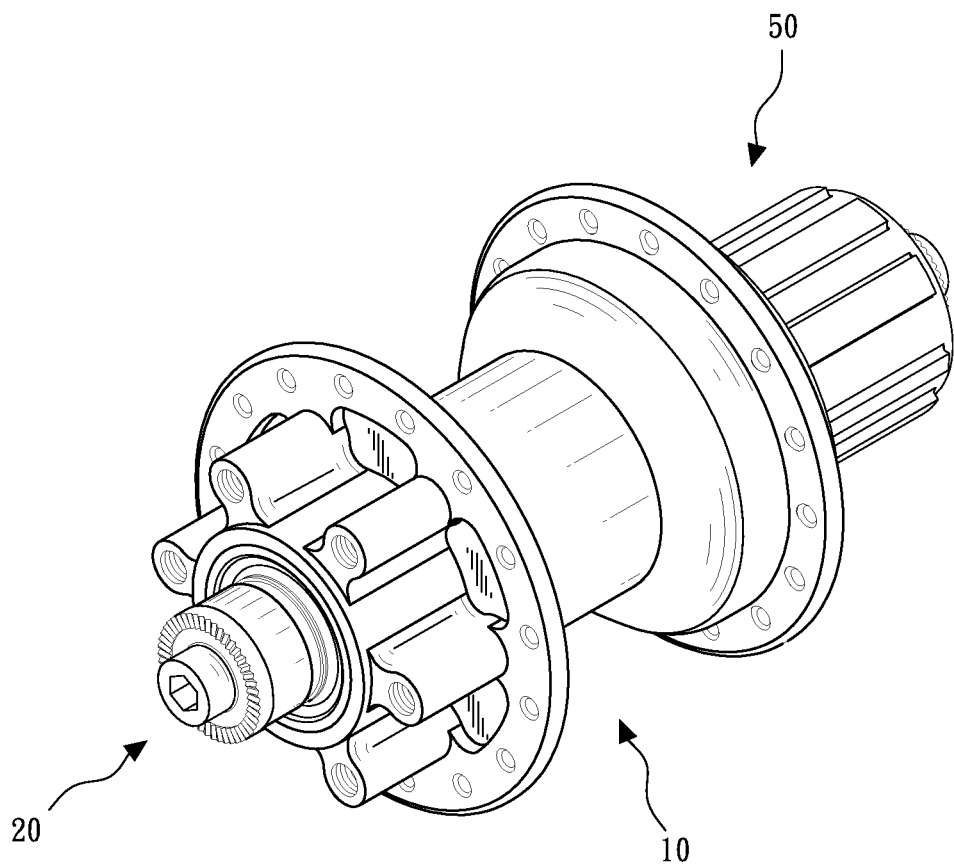
FIG. 1 is a perspective view of a ratchet hub according to the present invention.
Figure 2:
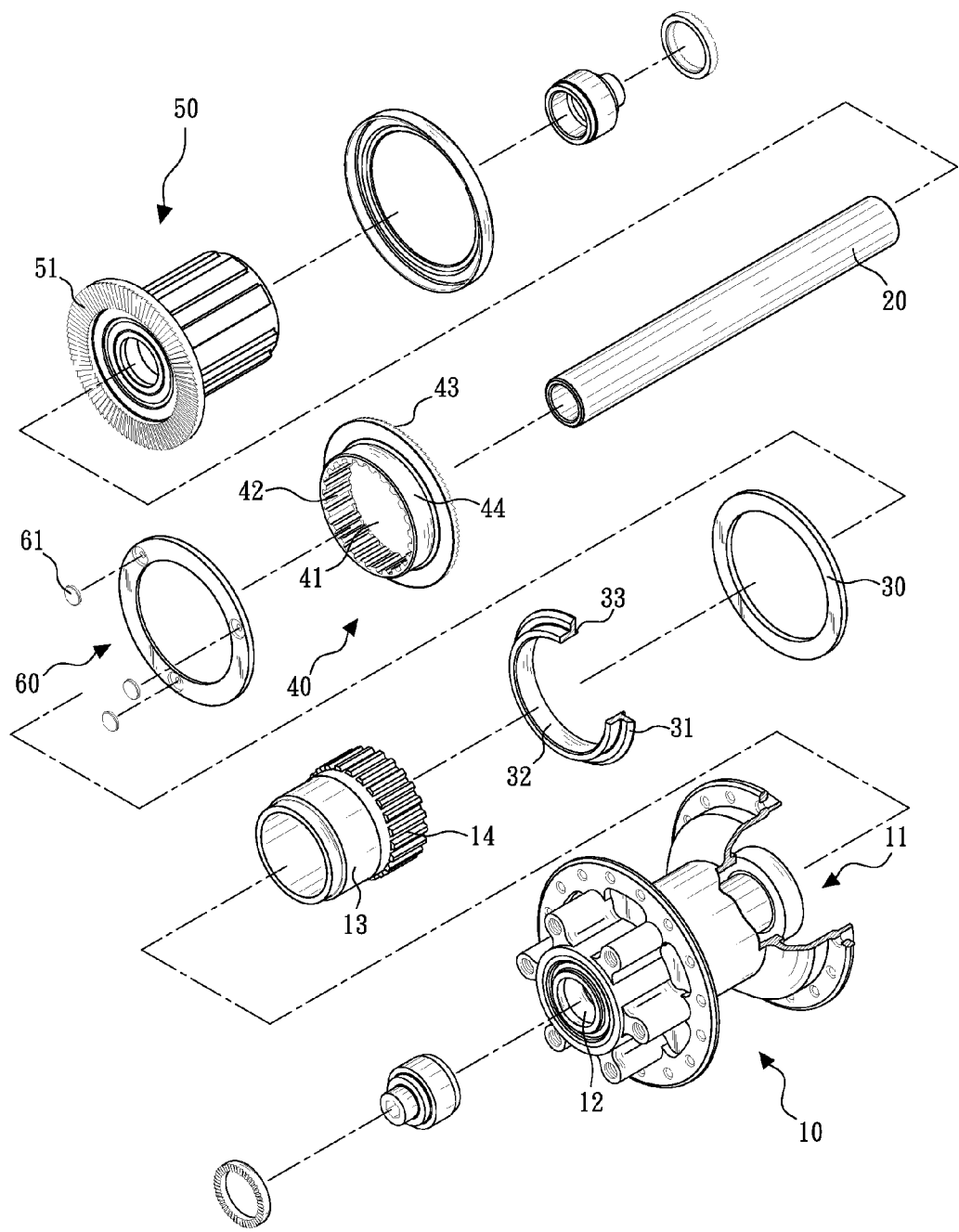
FIG. 2 is an exploded view of the ratchet hub according to the present invention.

According to the present invention, a ratchet hub using a magnetically repulsive force for restoration has a freewheel unit and ratchet ring thereof forming a unidirectional ratchet mechanism and a magnetic assembly using a magnetically repulsive force to normally make the freewheel unit and ratchet ring engage mutually and allow force transmission therebetween. Once a force disengaging the freewheel unit from the ratchet ring surpasses the magnetically repulsive force, a second circular toothed surface is pushed away from the freewheel unit. The second circular toothed surface can automatically return to engage with the freewheel unit when the force disengaging the freewheel unit from the ratchet ring disappears.

The following one or more preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention and are not made to scale.

In one embodiment of the present, a ratchet hub is as shown in FIG. 1 through FIG. 4.

The ratchet hub includes a hub body 10 having one end formed with an open-end ratchet shell 11, and a shaft hole 12 passing axially through the hub body 10. The shaft hole 12 at the open end of the ratchet shell 11 receives a sliding sleeve 13. The sliding sleeve 13 has its outer periphery formed with a plurality of axial grooves 14.

The ratchet hub includes also a shaft 20 such passes through the shaft hole 12 and the sliding sleeve 13 that the hub body 10 is rotatable about the shaft 20.

The ratchet hub further includes a magnetic part 30, in the present embodiment, formed as a magnetic ring (hereinafter referred to as the magnetic ring 30) and fixed to the ratchet shell 11 such that a positioning ring 31 is held between the ratchet shell 11 and the magnetic ring 30. The positioning ring 31 defines a central hole 32 by which the positioning ring 31 is mounted around the sliding sleeve 13. The positioning ring 31 has a positioning rim 33 extending axially and circling the central hole 32. The positioning rim 33 helps the positioning ring 31 to engage with the magnetic ring 30. The positioning ring 31 is made of an elastic material, such that it can position itself with respect to the inner surface of the ratchet shell 11.

The ratchet hub essentially includes a ratchet ring 40 centrally defining a through hole 41. The ratchet ring 40 has its inner periphery formed with a plurality of sliding teeth 42 circling the through hole 41. These sliding teeth 42 are configured to engage the axial grooves 14, so that the ratchet ring 40 can combine with the sliding sleeve 13 with the magnetic ring 30 sandwiched therebetween in the manner that the ratchet ring 40 is axially slidable yet non-rotatable with respect to the sliding sleeve 13. The ratchet ring 40 has its one surface opposite to the other surface that faces the magnetic ring 30 formed as a second circular toothed surface 43. Moreover, a connecting portion 44 extends from the surface of the ratchet ring 40 facing the magnetic ring 30.

The disclosed ratchet hub also has a freewheel unit 50 that is rotatably mounted around the shaft 20 and has a first circular toothed surface 51 facing and configured to engage and form a unidirectional ratchet mechanism with the second circular toothed surface 43 on the ratchet ring 40.

Another magnetic part 60, in the present embodiment, formed as a pushing ring (hereinafter referred to as the pushing ring 60) is fixedly mounted around the connecting portion 44 of the ratchet ring 40, such that the pushing ring 60 is sandwiched between the magnetic ring 30 and the ratchet ring 40. The pushing ring 60 is embedded with a plurality of magnetic members 61. These magnetic members 61 and the magnetic ring 30 are such arranged that they face each other with the same magnetic pole. Thereby, there is normally a magnetically repulsive force existing between the pushing ring 60 and the magnetic ring 30 and makes the second circular toothed surface 43 and the first circular toothed surface 51 engage with each other normally.

A plurality of bearings 70 are deposited between the shaft 20 and the hub body 10, and between the shaft 20 and the freewheel unit 50, respectively, so as to ensure smooth rotation of the shaft 20 with respect to the hub body 10, and the freewheel unit 50, respectively.

Therein, one or both of the ratchet ring 40 and the freewheel unit 50 is made of a non-magnetically permeable material. With the configuration described above, the following detailed description will be directed to the operation of the present invention.

Figure 3:
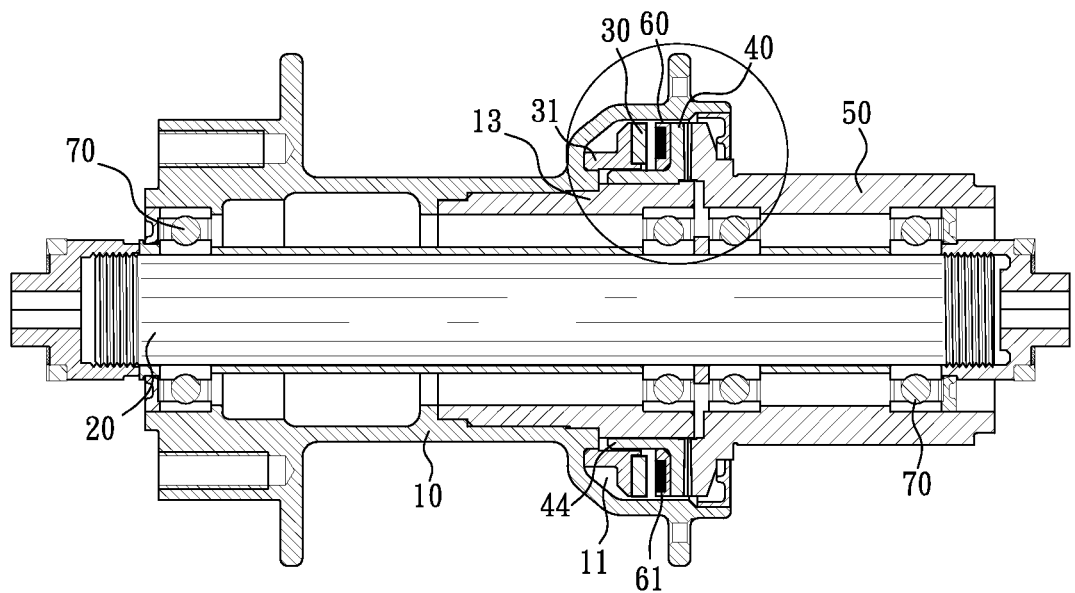
FIG. 3 is a cross-sectional view of the ratchet hub according to the present invention.
Figure 4:
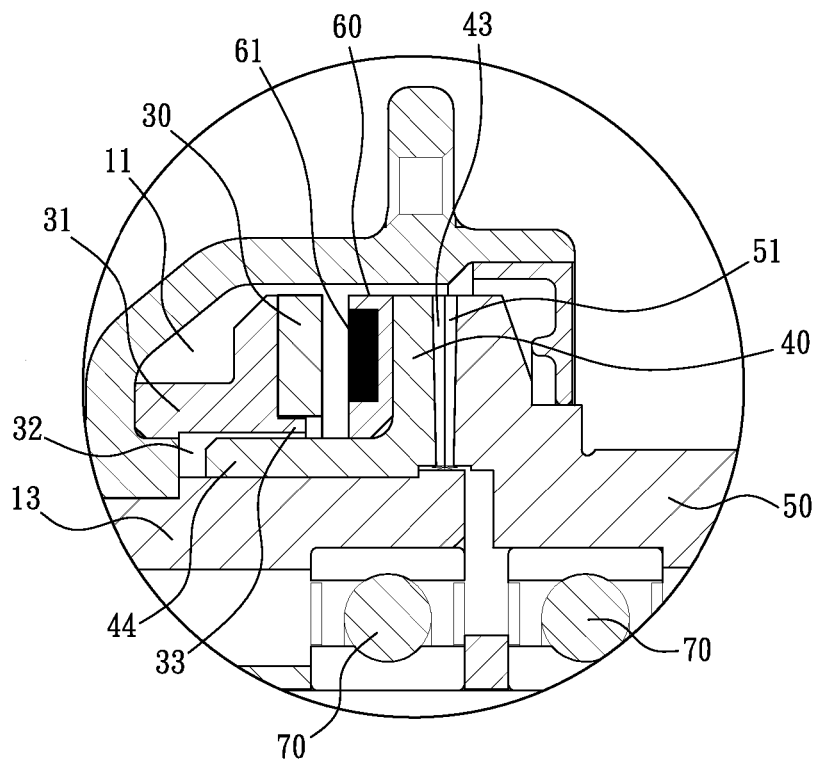
FIG. 4 is a partially enlarged view of the part circled in FIG. 3.
Figure 5:
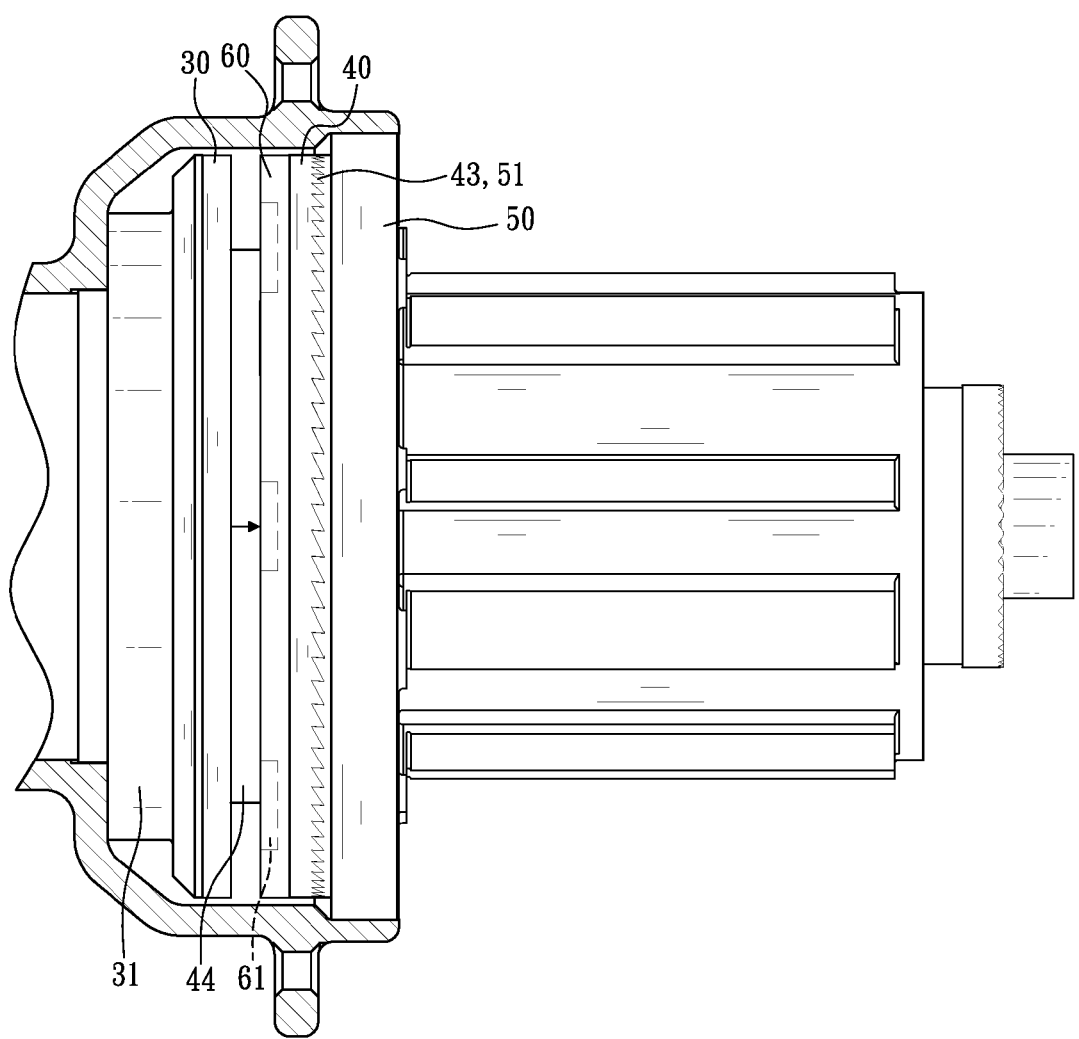
FIG. 5 and FIG. 6 are partial, cross-sectional views of the ratchet hub according to the present invention illustrating its operation.

Referring to FIG. 5 together with FIG. 3, the present invention implements the magnetically repulsive force existing between the pushing ring 60 and the magnetic ring 30 to make the second circular toothed surface 43 and the first circular toothed surface 51 engage with each other normally. When the freewheel unit 50 rotates forward, or along a first direction (as happening when a cyclist pedals the bicycle having the disclosed ratchet hub forward), the ratchet ring 40 is at an engaged position on the sliding sleeve 13, where the second circular toothed surface 43 and the first circular toothed surface 51 engage with each other, so that the freewheel unit 50 drives the ratchet ring 40, the sliding sleeve 13 and the hub body 10 successively, making the hub body 10 to rotate about the shaft 20.

Figure 6:
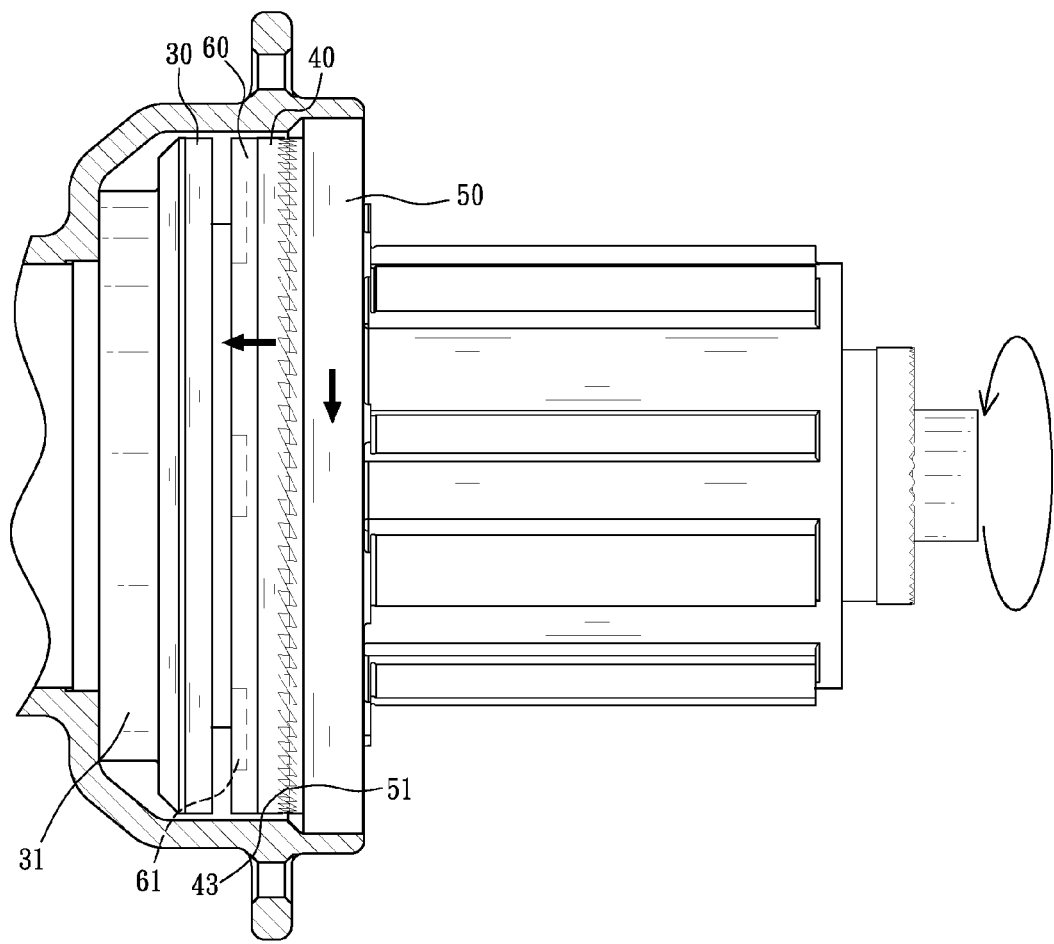

As shown in FIG. 6 together with FIG. 3, when the freewheel unit 50 rotates reversely, or along a second direction, since the second circular toothed surface 43 and the first circular toothed surface 51 jointly form the unidirectional ratchet mechanism, a pushing force is generated and acts on the ratchet ring 40. Once the pushing force surpasses the magnetically repulsive force existing between the pushing ring 60 and the magnetic ring 30, the ratchet ring 40 is pushed to move along the sliding sleeve 13 toward its disengaged position where the second circular toothed surface 43 separates from the first circular toothed surface 51, making the freewheel unit 50 run without driving the ratchet ring 40, the sliding sleeve 13 and the hub body 10. When the freewheel unit 50 rotates forward again and thus the pushing force no more exists, the magnetically repulsive force between the pushing ring 60 and the magnetic ring 30 can immediately, automatically restore the ratchet ring 40 to the engaged position, so the restoration is accomplished rapidly.

The present invention uses the magnetically repulsive force normally existing between the pushing ring 60 and the magnetic ring 30 as the power source for the restoration of the ratchet ring 40 with respect to the freewheel unit 50, so it advantageously exhibits the rapid restoration and reduces mechanical resistance that otherwise would seriously happen in the prior-art device. Furthermore, the magnetic ring 30 and the magnetic members 61 are substantively permanent magnets, whose magnetism lasts without degradation even after long-term use. Thus, the present invention, compared with the traditional spring-based device that could suffer elastic fatigue, is more durable and has longer service life.

In addition, since one or both of the ratchet ring 40 and the freewheel unit 50 is made of a non-magnetically permeable material, when approached by the magnetic members 61, they will not cause the second circular toothed surface 43 and the first circular toothed surface 51 to be inseparable from each other due to magnetic attraction. This design not only ensures the normal operation of the ratchet hub, but also prevents foreign matters such as iron dust from being attracted into the interior of the hub and wearing the components of the hub.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A ratchet hub primarily comprising:
 a hub body having one end formed with an open-end ratchet shell; and
 a ratchet assembly coaxially received in the ratchet shell of the hub body and comprising:
  a freewheel unit being configured to rotate along a first rotational direction or a second rotational direction when receiving a driving power, and having a first circular toothed surface;
  a ratchet ring having a second circular toothed surface configured to engage with the first circular toothed surface of the freewheel unit, wherein the first circular toothed surface and the second circular toothed surface form a unidirectional ratchet mechanism, such that when the freewheel unit rotate along the first rotational direction, the first circular toothed surface and the second circular toothed surface engage with each other and allow force transmission therebetween, and when the freewheel unit rotates along the second rotational direction, the first circular toothed surface and the second circular toothed surface disengage from each other and disallow force transmission therebetween;
  a sliding sleeve being telescoped with the ratchet ring in a manner that the sliding sleeve and the ratchet ring are axially slidable yet non-rotatable with respect to each other, such that the ratchet ring is allowed to slide axially against the sliding sleeve between an engaged position and a disengaged position, wherein when the ratchet ring is at the engaged position, the first circular toothed surface and the second circular toothed surface engage with each other, and when the ratchet ring is at the disengaged position, the first circular toothed surface and the second circular toothed surface disengage from each other, while the hub body having a shaft hole passing axially therethrough, and the sliding sleeve having an outer periphery thereof formed with a plurality of axial grooves;
  a shaft such passing through the shaft hole and the sliding sleeve that the hub body is allowed to rotate about the shaft;
  a magnetic assembly including a first magnetic part fixed to the ratchet ring and a second magnetic part fixed to the hub body, wherein the first and second magnetic parts face each other with an identical magnetic pole, such that a repulsive force normally exists therebetween and makes the ratchet ring normally stay at the engaged position, wherein when the freewheel unit rotates along the second rotational direction, a force disengaging the first circular toothed surface from the second circular toothed surface surpasses the repulsive force and pushes the ratchet ring toward the disengaged position, while the second magnetic part of the magnetic assembly comprises a magnetic ring being fixed to the ratchet shell;
 wherein the ratchet ring centrally defining a through hole, the ratchet ring having an inner periphery thereof formed with a plurality of sliding teeth circling the through hole, the sliding teeth being configured to engage with the axial grooves, so that the sliding sleeve and the ratchet ring are such telescoped that the sliding sleeve and the ratchet ring are axially slidable yet non-rotatable with respect to each other;
 wherein the first magnetic part of the magnetic assembly comprising a pushing ring located between the magnetic ring and the ratchet ring, wherein the pushing ring is made magnetic by a plurality of magnetic members inlaid thereto, in which each said magnetic member and the magnetic ring face each other with the identical magnetic pole; and
 a positioning ring that has a central hole by which the positioning ring is such mounted around the sliding sleeve that the positioning ring is located between the magnetic ring and the hub body, wherein the positioning ring is made of an elastic material, so that the positioning ring is self-positioned on an inner wall of the ratchet shell.

2. The ratchet hub of claim 1, further comprising a connecting portion extending axially from the ratchet ring toward the magnetic ring for the pushing ring to be mounted therearound.

3. The ratchet hub of claim 1, wherein the positioning ring has a positioning rim extending axially and circling the central hole for helping the positioning ring to engage with the magnetic ring.

4. The ratchet hub of claim 1, wherein the ratchet ring is made of a non-magnetically permeable material.

5. The ratchet hub of claim 1, wherein the freewheel unit is made of a non-magnetically permeable material.

6. The ratchet hub of claim 1, further comprising at least one bearing deposited between the shaft and the hub body.

7. The ratchet hub of claim 1, further comprising at least one bearing deposited between the shaft and the freewheel unit.

* * * * *